(12) United States Patent
Cohen et al.

(10) Patent No.: US 10,568,350 B1
(45) Date of Patent: Feb. 25, 2020

(54) SNACK REFRESHMENT DEVICE

(71) Applicants: Jesse Cohen, La Jolla, CA (US); Scott Curry, San Marco, CA (US)

(72) Inventors: Jesse Cohen, La Jolla, CA (US); Scott Curry, San Marco, CA (US)

(73) Assignee: JBC Cpital, Inc., La Jolla, CA (US)

( * ) Notice: Subject to any disclaimer, the term of this patent is extended or adjusted under 35 U.S.C. 154(b) by 81 days.

(21) Appl. No.: 15/395,145

(22) Filed: Dec. 30, 2016

Related U.S. Application Data

(60) Provisional application No. 62/272,681, filed on Dec. 30, 2015.

(51) Int. Cl.
| | |
|---|---|
| *A47J 36/24* | (2006.01) |
| *A23L 5/20* | (2016.01) |
| *A23L 19/18* | (2016.01) |
| *A47J 36/00* | (2006.01) |

(52) U.S. Cl.
CPC ............ *A23L 5/21* (2016.08); *A23L 19/18* (2016.08); *A47J 36/00* (2013.01); *A47J 36/24* (2013.01); *A47J 36/2483* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 2,732,632 A | * | 1/1956 | Koster | G01N 5/045 34/233 |
| 3,634,651 A | * | 1/1972 | Siegel | B01L 7/00 219/386 |
| 3,949,733 A | | 4/1976 | Miller | |
| 4,380,127 A | * | 4/1983 | Roberts | A23L 3/40 239/558 |
| 4,494,314 A | * | 1/1985 | Gell, Jr. | A23N 12/08 219/502 |
| 4,495,932 A | | 1/1985 | Bratton | |
| 4,602,147 A | * | 7/1986 | Gell | A23N 12/08 219/497 |
| 4,763,568 A | * | 8/1988 | Kiczek | A23L 7/187 219/400 |
| 5,229,117 A | | 7/1993 | Leland | |
| 5,735,194 A | * | 4/1998 | Cochran | A23N 12/12 34/371 |
| 5,910,264 A | | 6/1999 | Dauliach | |
| 5,996,480 A | * | 12/1999 | Kelley | A23N 12/08 99/468 |
| 6,039,926 A | * | 3/2000 | Goldman | A61L 2/06 219/492 |
| 9,655,378 B2 | * | 5/2017 | Rooney | A23L 7/187 |
| 2015/0047511 A1 | * | 2/2015 | Mastroianni | A23L 7/183 99/323.5 |

(Continued)

*Primary Examiner* — Joseph M Pelham
(74) *Attorney, Agent, or Firm* — Muskin and Farmer LLC

(57) ABSTRACT

A method and apparatus to refresh food pieces. Food pieces (such as potato chips, etc.) can become stale when exposed to moisture for periods of time. An apparatus includes a heater and a blower which generate hot air blown into a connected container. Thus, the food pieces are rejuvenated when exposed to streams of hot air and can become "unstale" therefore ready for eating. A control on a base of the apparatus can separately control both the heater and the blower.

20 Claims, 14 Drawing Sheets

(56) References Cited

U.S. PATENT DOCUMENTS

| | | | |
|---|---|---|---|
| 2015/0050406 A1* | 2/2015 | Mastroianni | A23L 7/183 |
| | | | 426/520 |
| 2015/0257419 A1* | 9/2015 | Mastroianni | A23L 7/183 |
| | | | 99/323.11 |
| 2015/0305375 A1* | 10/2015 | Rooney | A23L 7/187 |
| | | | 426/523 |
| 2018/0310596 A1* | 11/2018 | Cretors | A23L 7/174 |

* cited by examiner

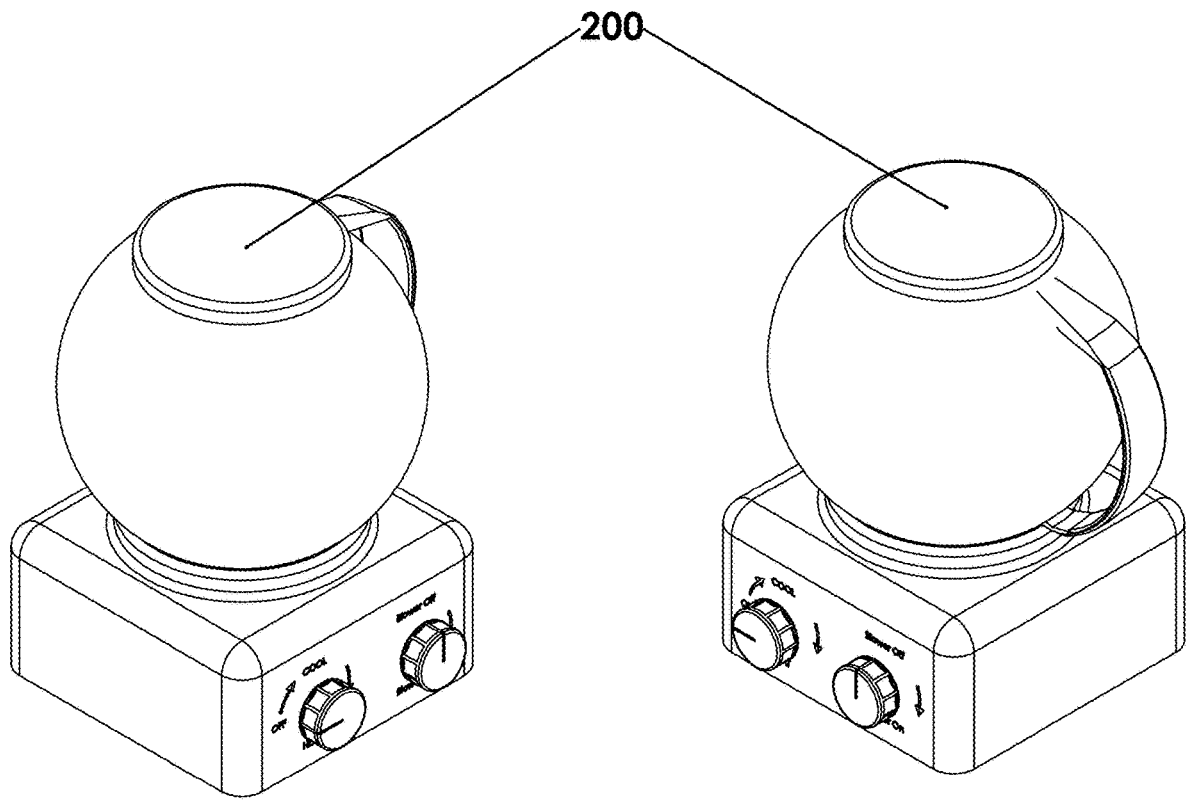
FIG. 2A        FIG. 2B

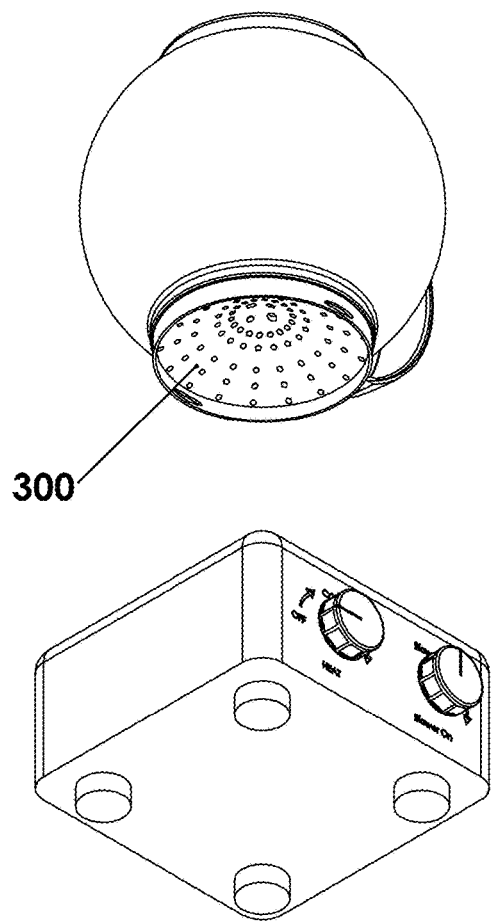
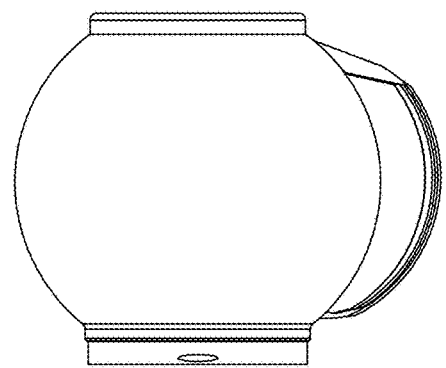
FIG. 3A      FIG. 3B

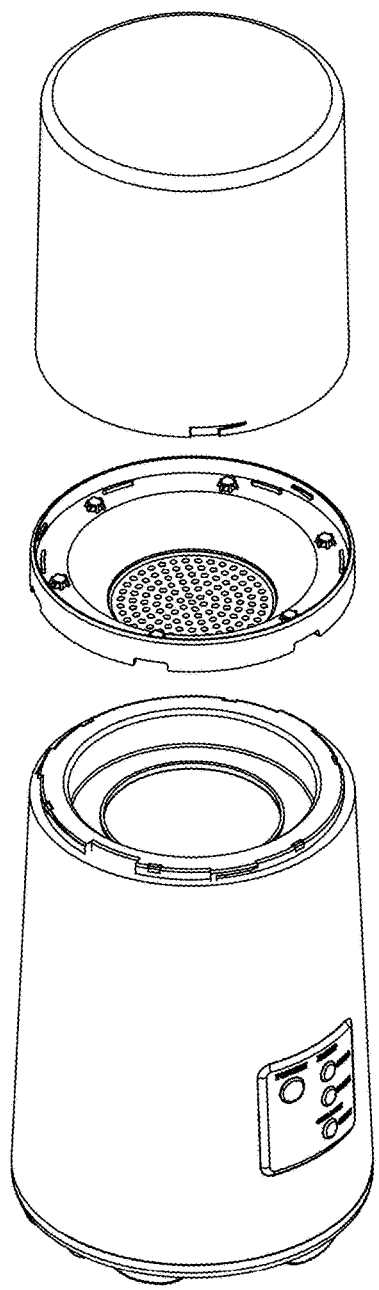
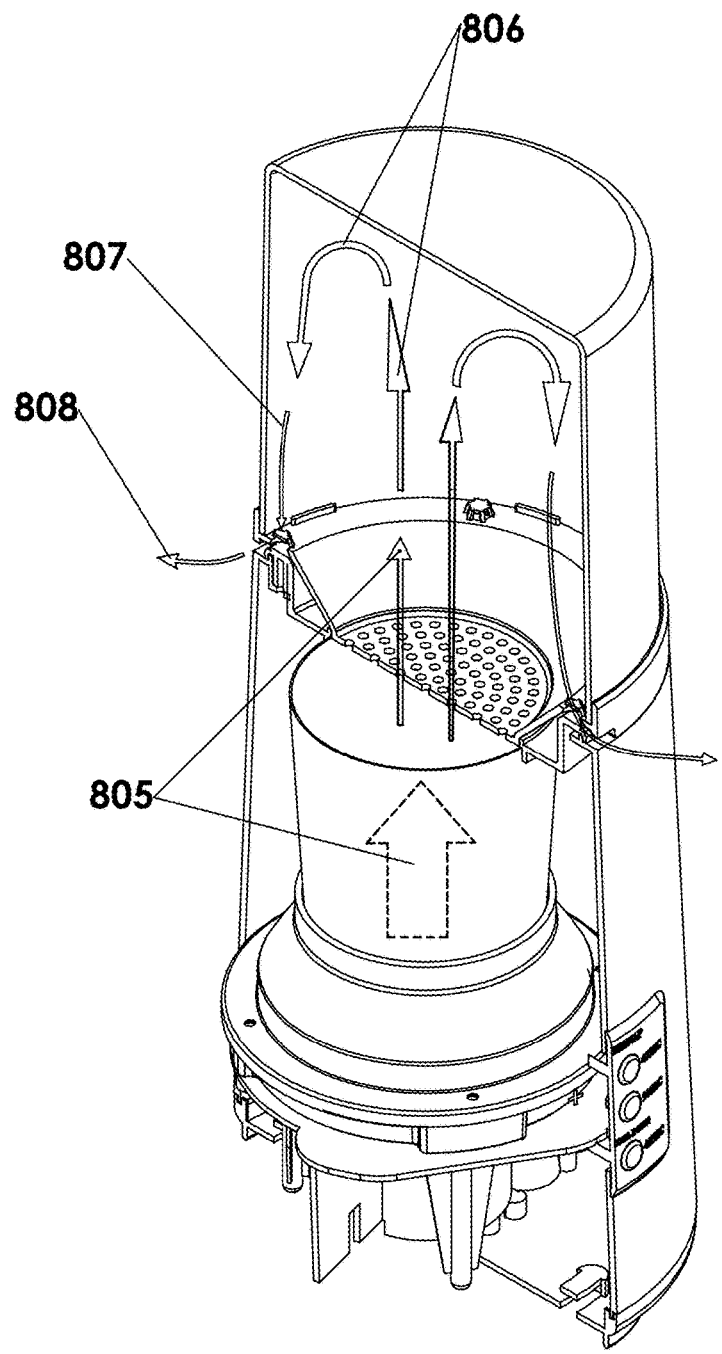
FIG. 8C　　　　FIG. 8D

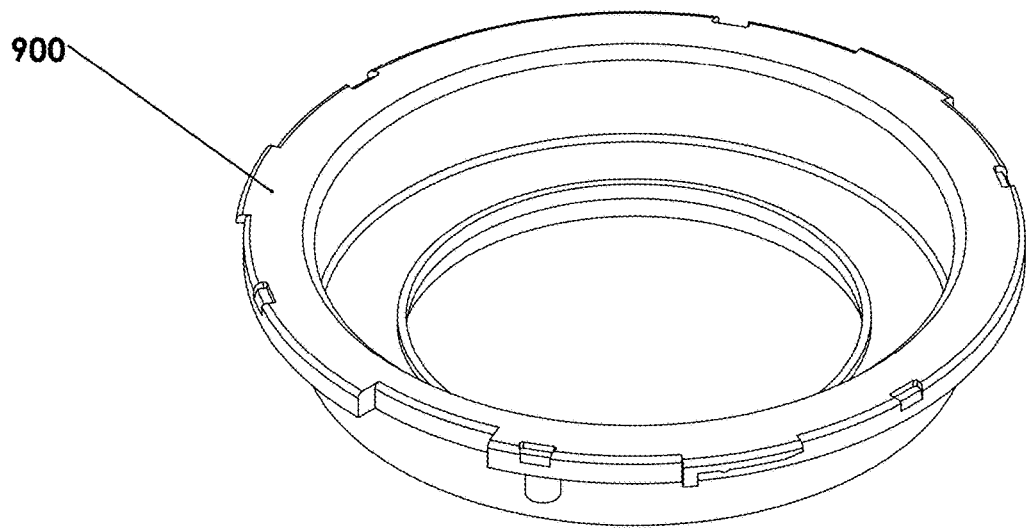
FIG. 9A
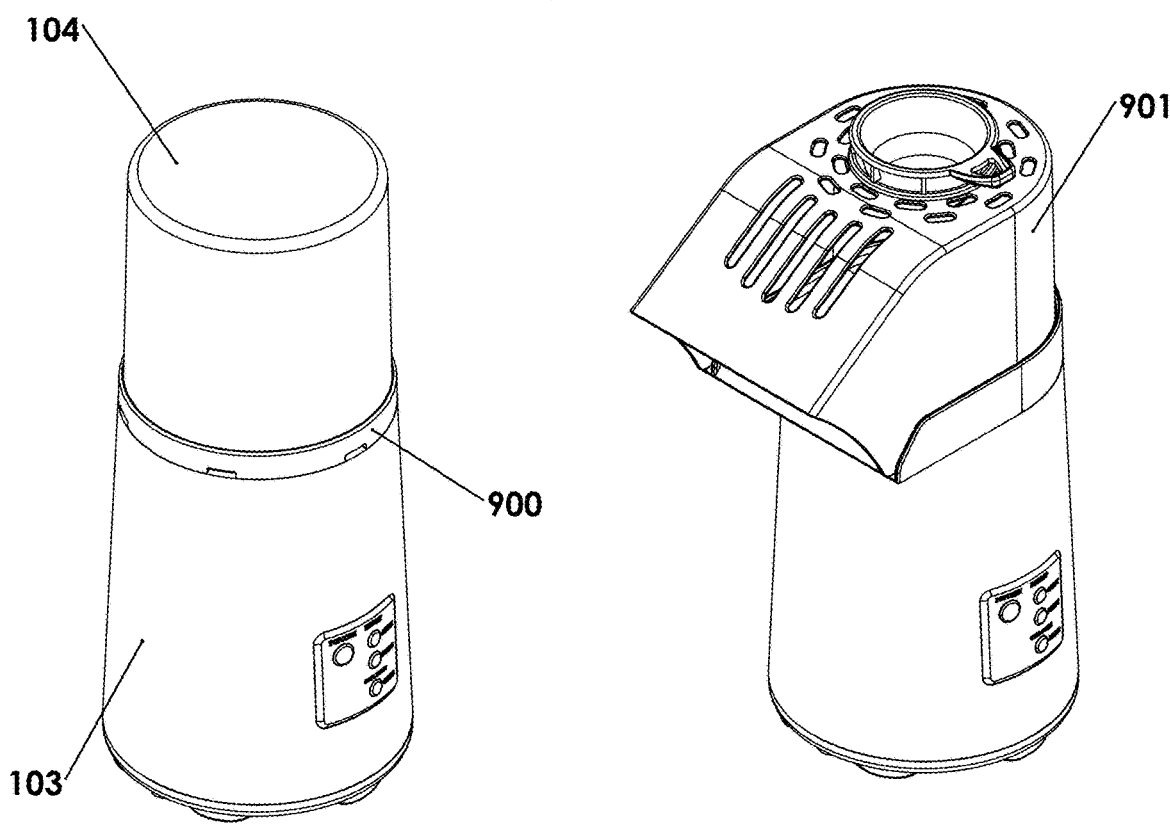
FIG. 9B
FIG. 9C

SNACK REFRESHMENT DEVICE

CROSS REFERENCE TO RELATED APPLICATIONS

This application claims benefit to U.S. provisional application 62/272,681, filed on Dec. 30, 2015, which is incorporated by reference herein in its entirety.

BACKGROUND OF THE INVENTION

Field of the Invention

The present general inventive concept is directed to a method and apparatus to refresh snacks and other food that has become stale or aged via exposure to humidity.

SUMMARY OF THE INVENTION

It is an aspect of the present invention to provide an improved food revitalization mechanism and method.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 2A is a first view of a refresher apparatus, according to an embodiment;

FIG. 2B is a second view of a refresher apparatus, according to an embodiment;

FIG. 3A is a first view of a separated base and container, according to an embodiment;

FIG. 3B is a front view of a separated base and container, according to an embodiment;

FIG. 8C is an exploded view of the container, screen member, adapter ring and base, according to an embodiment;

FIG. 8D is a cut away view of the container, screen member, adapter ring and base, according to an embodiment;

FIG. 9A is an upper view of an adapter ring, according to an embodiment;

FIG. 9B is a drawing of a container attached to a base, according to an embodiment;

FIG. 9C is a view of a popcorn hood attached to a base, according to an embodiment;

DESCRIPTION OF THE PREFERRED EMBODIMENTS

Figure 1:
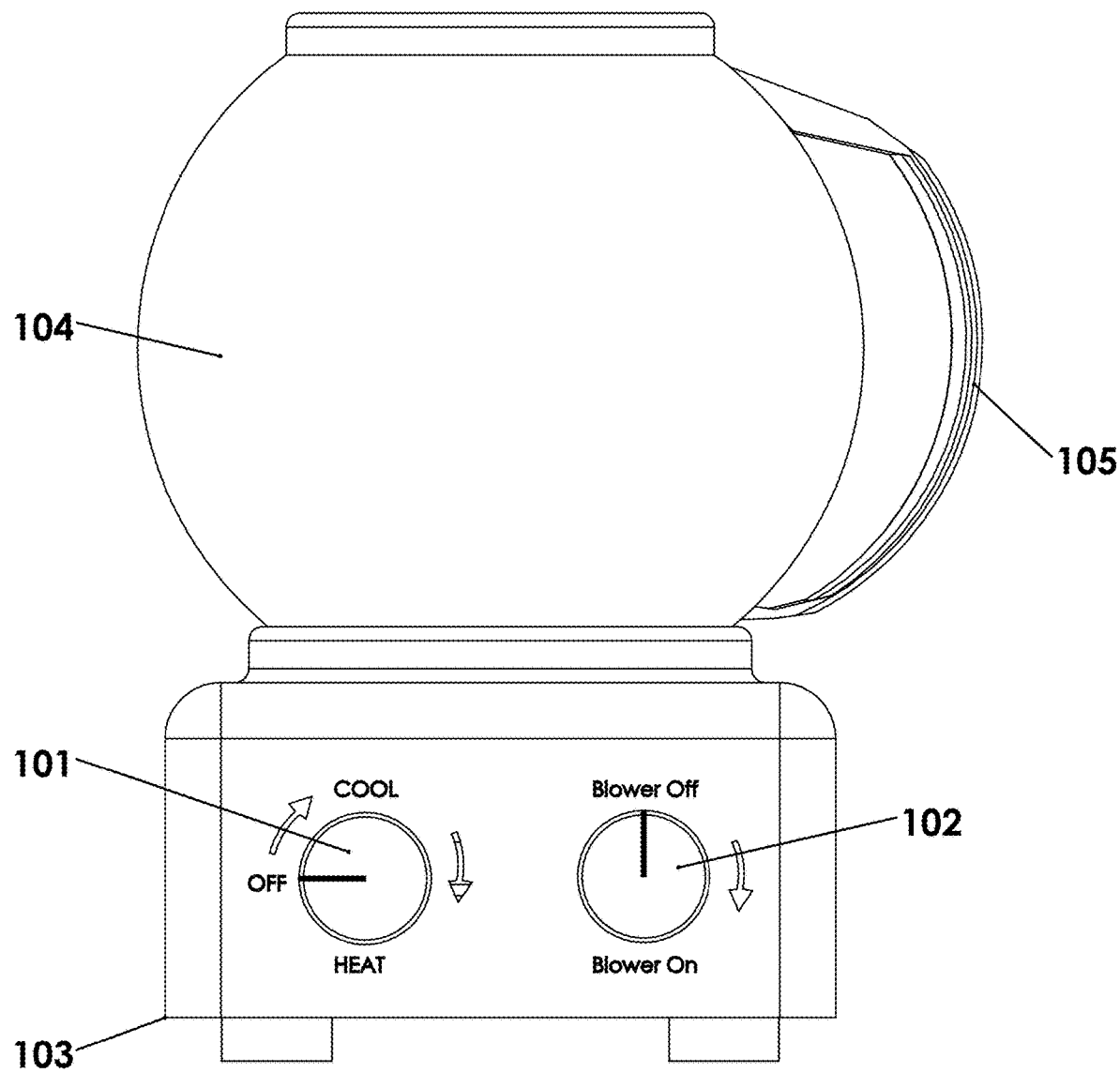
FIG. 1 is a front view of a refresher apparatus, according to an embodiment.

Reference will now be made in detail to the presently preferred embodiments of the invention, examples of which are illustrated in the accompanying drawings, wherein like reference numerals refer to like elements throughout.

The present inventive concept relates to a method and apparatus which serves to refresh food. Food that is left outside for a period of time can eventually subject to chemical processes which cause them to become stale or otherwise unfresh (which could include the food becoming hard, soft, or soggy depending on the type of food). Examples of food that are subject to this effect include cereal, popcorn, croutons, Cheetos, potato chips, and many other foods. For example, potato chips left out (not stored in an airtight container) can become hydrated as a result of moisture in the air binding to the chips and thus turns into a stale state (not crisp and hence not desirable). Some foods that have been stale can be refreshed by heating it. For example, when stale potato chips are heated this can remove some of the moisture inside them thus making them "refreshed" and can taste as good as new.

The refresher described herein utilizes both a heater(s) and a blower(s) in which the blower lofts the food around in the container to exposing all surfaces of the food to the heated air from heater. Food (snacks) that have been exposed to humidity and have become stale can now be placed into the container. The apparatus when turned on, and after a short period of time (e.g., 45 sec-5 min) will refreshed by dehydrating the food, e.g., in a more crisp condition to eat again. The refreshment comes from being exposed to heat (hot dry air), in which the apparatus described herein is designed to ensure that all surfaces of the food placed inside the container are subject to the blown hot air and infrared spectrum heat revitalizing the crisp original consistency intended for the food or snack product when it was originally packaged.

The refresher described herein utilizes both a heater and a blower which blows the food around in a container (which can be a bowl, square, or any other shape) thereby exposing all surfaces of the food to the blower/heat. The container can be made out of any material (typically transparent), such as glass, plastic, etc.

FIG. 1 is a front view of a refresher apparatus, according to an embodiment.

A temperature knob 101 is used to turn (power) a heater on and also adjust the temperature of the heater. A blower power knob 102 is used to turn (power) a blower on and also adjust the power of the blower (e.g., from low to high strength/power). The blower and heater are both inside the base 103. A container 104 (typically made of glass) is used to contain the food particles so that they can be blown around by the blower but will not exit the container. A handle 105 is attached to the container 104 and is used for easy lifting of the container 104 out of the base 103.

Note that while two knobs are shown, in other embodiments different control structures can be used. For example, a single knob can be used with the following preset configuration: off (turns both blower motor and heater off), low (sets both blower motor and heater to low), medium (sets blower motor to low and heater temperature to high), and high (sets blower motor to high and heater temperature to high). Alternatively, there can be a simple on/off switch for the blower motor (with no variations in strength) and a temperature knob for the heater (e.g., low, medium, high). In another embodiment, there can be a simple on/off switch for the heater (with no variations in temperature), and a strength knob for the blow motor (e.g., low, medium, high). In a further embodiment, there would simply be one on/off switch which simultaneously turns on/off both the motor and the heater.

Note that instead of knobs, any other type of input devices can be used as well, such as buttons, switches, levers, etc.

FIG. 2A is a first view of a refresher apparatus, according to an embodiment.

A lid 200 is shown which fits over the container and hence prevents any food particulars blowing around inside the container from flying out. The lid 200 can easily be removed off the container.

FIG. 2B is a second view of a refresher apparatus, according to an embodiment.

FIG. 3A is a first view of a separated base and container, according to an embodiment.

A screen 300 is attached to the container. The screen is easily removable and fits onto the bottom of the container. The screen also fits onto the top of the base.

FIG. 3B is a front view of a separated base and container, according to an embodiment.

Figure 4:
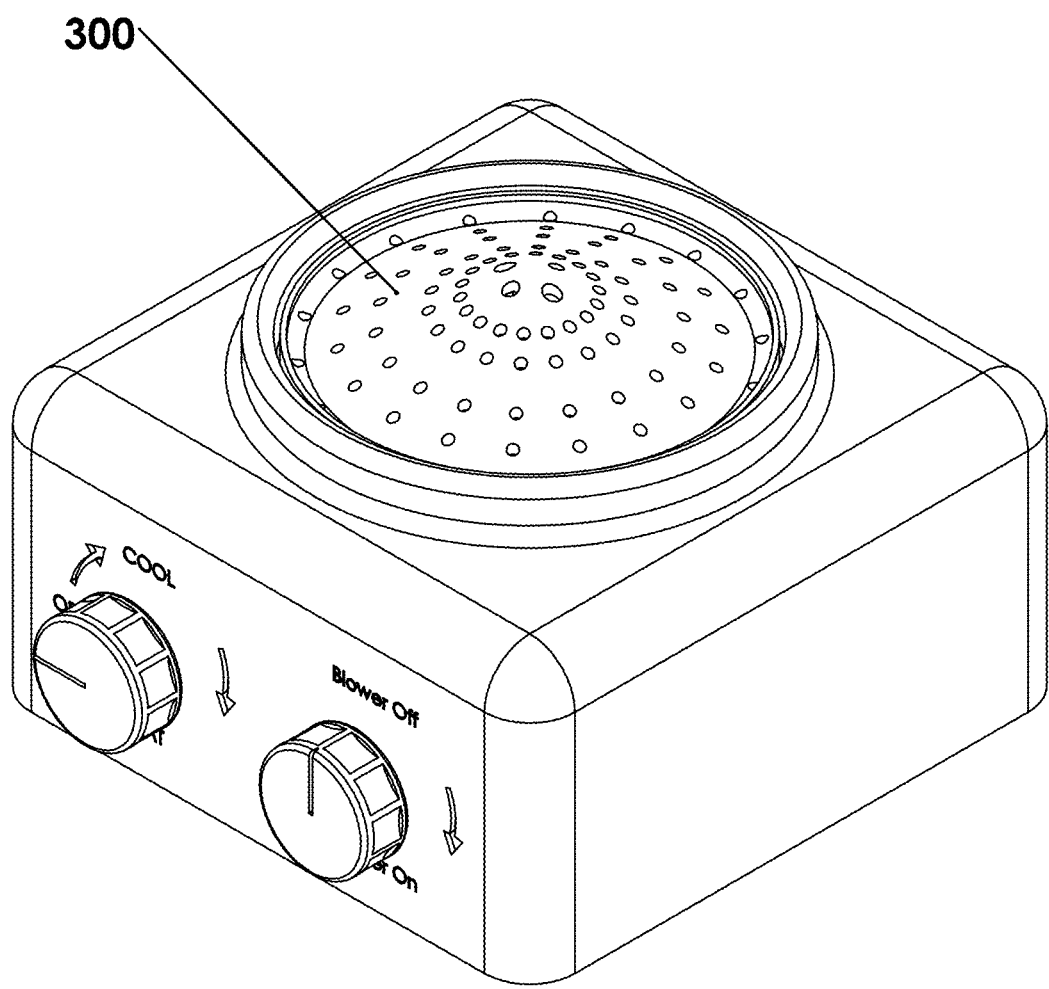
FIG. 4 is a view of the base and screen, according to an embodiment.

FIG. 4 is a view of the base and screen, according to an embodiment.

The screen 300 is shown placed on top of the base in which the circumference of the screen 300 forms an airtight seal with the base so air can only escape through the holes in the screen. The screen 300 will snap onto the base forming a friction fit thereby forming the seal. The seal can be formed via any mechanism attachment mechanism, such as snapping the parts together, screwing them together (assuming the parts have cooperative threads), etc. The screen can be made out of any material, such as plastic, metal (e.g., steel, aluminum, etc.) rubber, etc.

Figure 5:
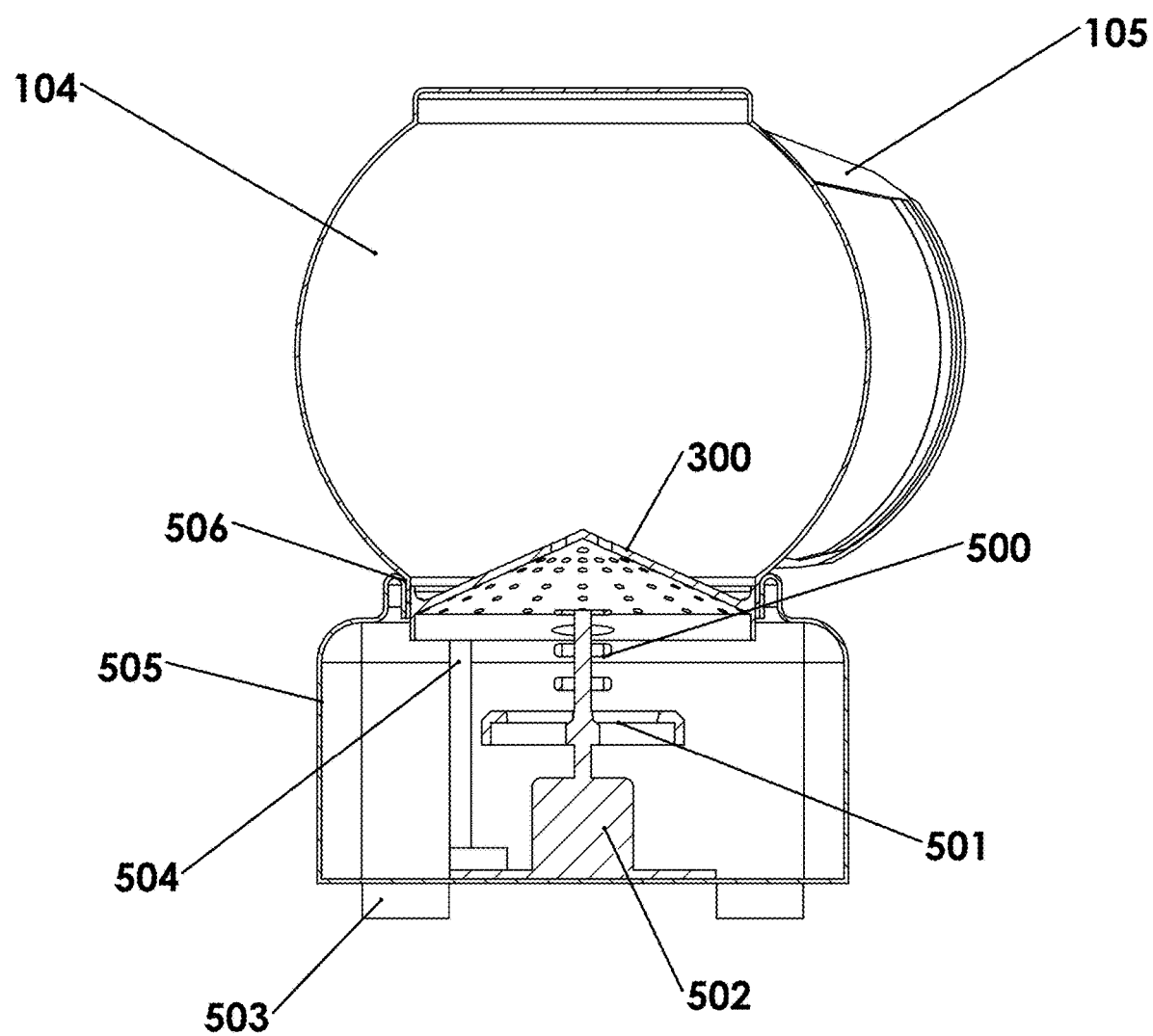
FIG. 5 is a cross sectioned front view showing the inside of the refresher apparatus, according to an embodiment.

FIG. 5 is a cross sectioned front view showing the inside of the refresher apparatus, according to an embodiment.

The container 104 fits over the base 505 such that air can only pass through the holes in the screen 300. An infrared heater 500 (controlled by temperature knob 101) heats up to a set temperature. The blower 501 (controlled by blower power knob 102) blows air up through the screen 300 into the container 104. The air around the infrared heater 500 is heated up so hence the air that is forced by the blower up into the container is hot. The blower comprises a fan blower 501 (a fan blade) which is driven by a blower motor 502 which turns the fan blower 501 and is what is controlled by the power knob 102.

A safety switch 504 is also present which automatically shuts off the heater 500 and/or the motor 502 when the container 104 is lifted. A sensor is present in the base/ housing which detects the weight of the container 104. When the weight is no longer present, it trips the safety switch and automatically turns off the power to the blower motor and the heater. Any other sensing method can be used as well as an alternative to a weight sensor, for example, a light sensor can detect when the container is removed which then trips the safety switch 504 and automatically turns off the power to the blower motor 502 and/or the heater 500.

While an infrared heater 500 is shown, any other type of heater (e.g., radiant heater, tourmaline coated coil, ionic heating system, or any other heating method.) can be used as well.

In an embodiment, a back pressure relief 506 is an area between the container 104 and the base 505 which catches air pressure from the blower and enables the container 104 to slightly lift off of the base 505 (in this embodiment the container is not integrally attached to the base 505). In this manner, excess pressure can be relieved by the excess pressure causing the container 104 to slightly elevate off of the base 505 and hence air flows between the base 505 and the container 104 for a brief period of time until the container 104 falls back onto the base 505.

Figure 6:
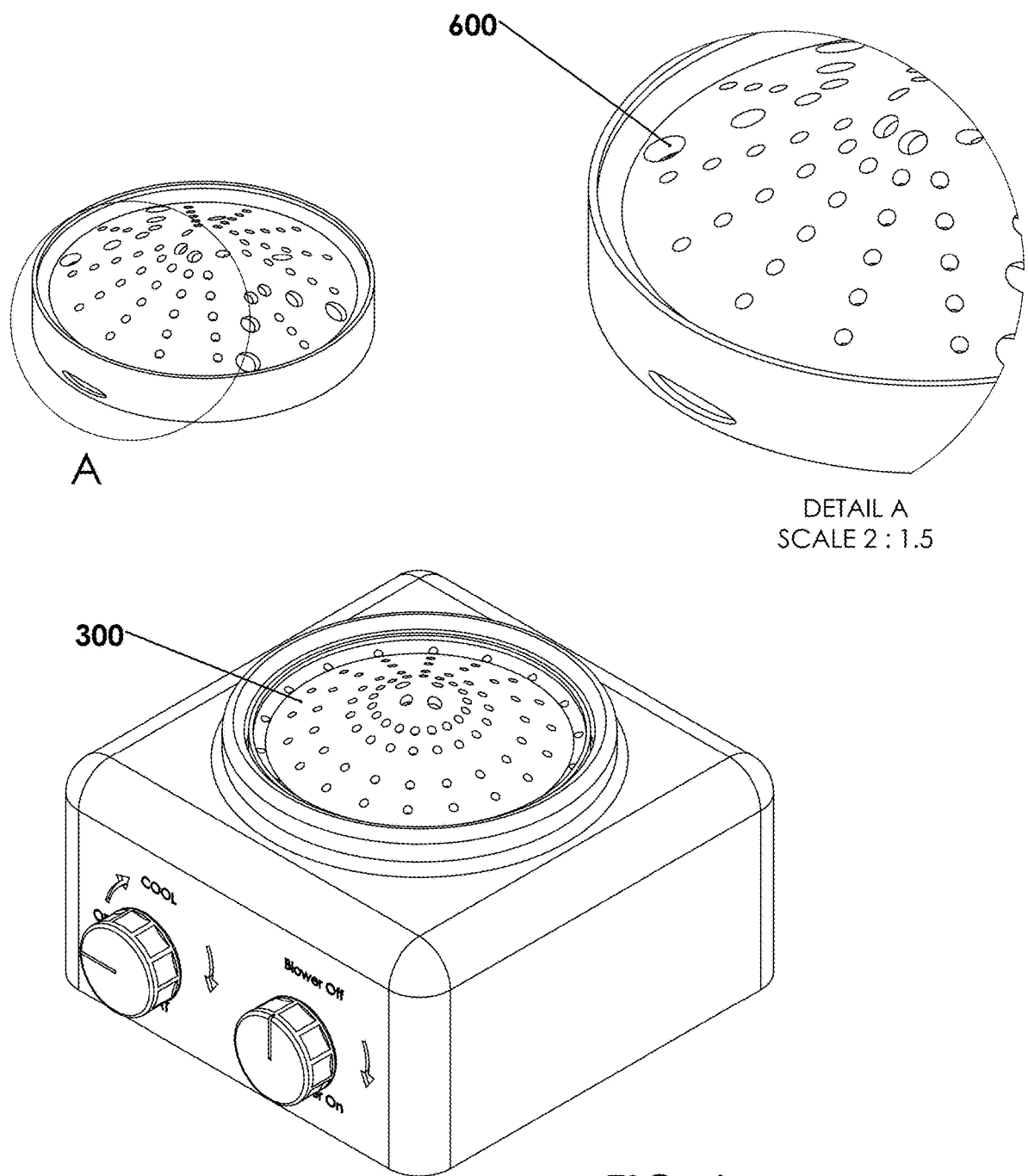
FIG. 6 is a view of the base and screen showing an enlarged portion, according to an embodiment.

FIG. 6 is a view of the base and screen showing an enlarged portion, according to an embodiment.

Note that there are port holes (holes) in the screen which are angles in a same orientation. For example, all the holes are funneled in a counter-clockwise direction thereby channeling all of the air blown from below into the container into a "vortex"-like (i.e. circular motion) effect. In order to maintain lofting effect, Air can escape through side holes in screen as a method to prevent back pressure from building up inside of container. Larger holes 600 are mixed with smaller holes.

All of the pieces of food in the container by virtue of being blown around will ultimately have all of their surfaces being touched by the hot air blowing from the blower. By blowing around in a circular motion will encourage an orderly blowing/cooperative motion of all of the pieces. If there was no blower, then the pieces on the bottom would block the pieces on the top from directly contacting with the hot air. Hence, the blower enables all pieces (and all surfaces of each piece) to come into contact with the hot air.

Figure 7:
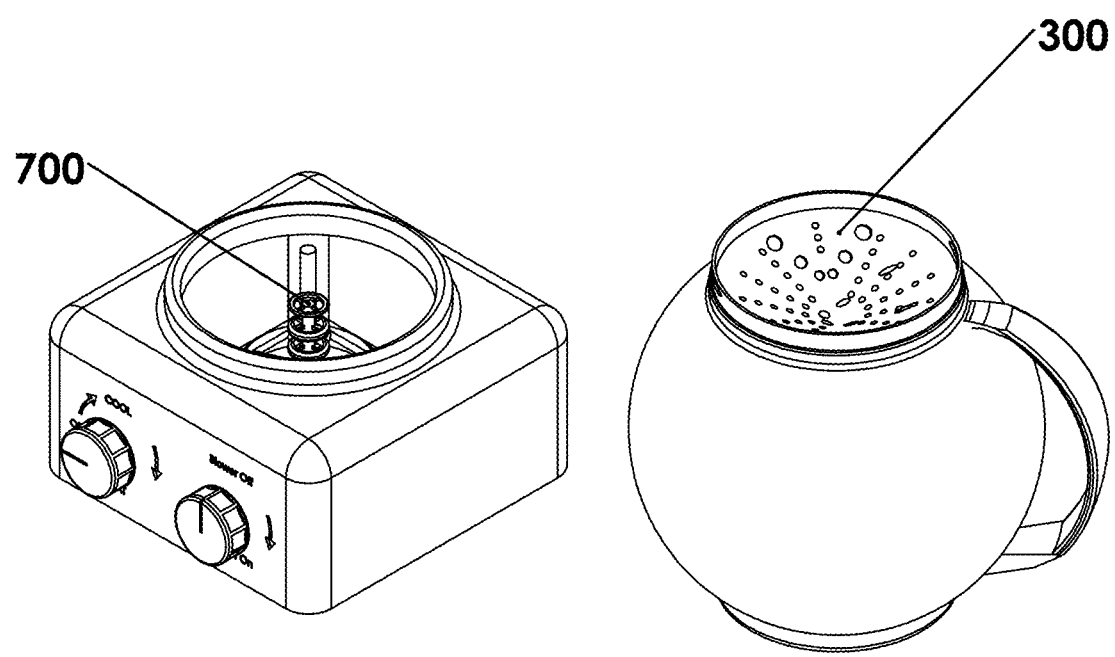
FIG. 7 is a view of the base with the attached screen on the container turned upside down, according to an embodiment.

FIG. 7 is a view of the base with the attached screen on the container turned upside down, according to an embodiment. A tourmaline coated coil 700 is used as the heating element (although of course any other type of heating element can be used as well). The underside of the screen 300 is shown.

Figures 8A, 8B:
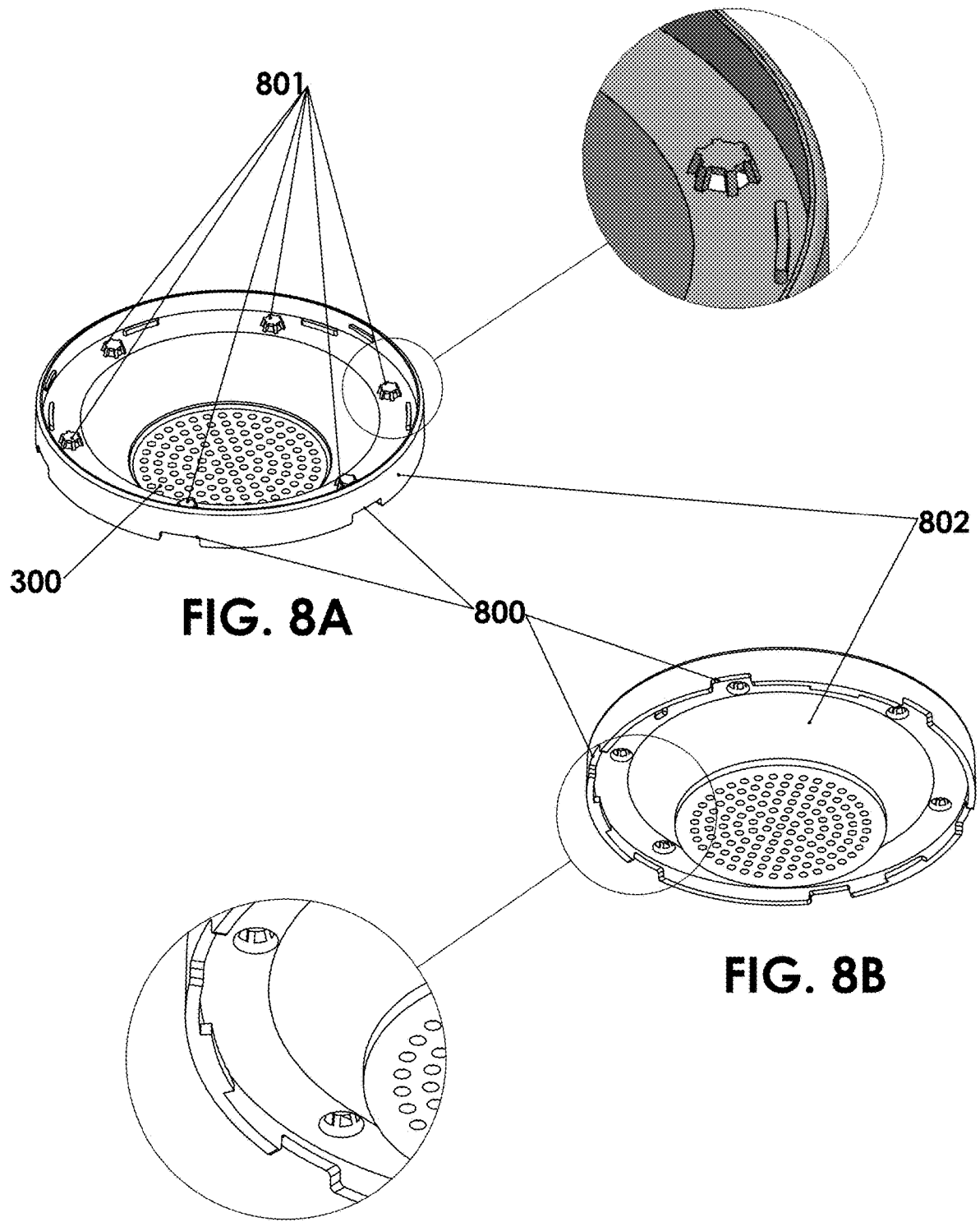
FIG. 8A is a top view of the screen member also showing an enlarged portion, according to an embodiment.
FIG. 8B is a bottom view of the screen member also showing an enlarged portion, according to an embodiment.

FIG. 8A is a top view of the screen member also showing an enlarged portion, according to an embodiment. The screen is housed in a screen member 802. Top ports 801 are also holes (or can be screened enabling air to pass through the screen but preventing food from passing therethrough) also enable air to pass through the top ports 801 thereby providing a channel for air to escape into lower ports. Lower ports 800 are shown which can be used to relieve air pressure by providing air flow or a passage to escape from upper ports. The air flow coming from the blower through screen then into the container provides lifting force for the food particles inside the container helping mix them inside the container as the air then escapes via the top ports 801 in the screen 300 and through the lower ports 800 to the outside of machine. In FIG. 8A one of the top ports 801 is shown enlarged but all of the top ports have an identical structure. In FIG. 8B, one of the lower ports 800 is shown enlarged but all of the lower ports 800 have an identical structure. As discussed, the air flow sequence can be (see FIG. 8D) from 1) inside the blower up through the screen flow 805 then 2) inside the container flow 806 and then 3) down from the container through the top ports 801 flow 807 and then 4) outside of the device through the bottom ports 800 flow 808. Both the top ports 801 and the bottom ports 800 are configured to allow air (but not food pieces) to pass therethrough via their size (or via the use of screening).

In this embodiment note that the screen is flat (in contrast to the embodiment shown in FIG. 6 where the screen is curved).

FIG. 8B is a bottom view of the screen member also showing an enlarged portion, according to an embodiment.

FIG. 8C is an exploded view of the container, screen member, adapter ring and base, according to an embodiment.

FIG. 8D is a cut away view of the container, screen member, adapter ring and base, according to an embodiment.

Figure 8E:
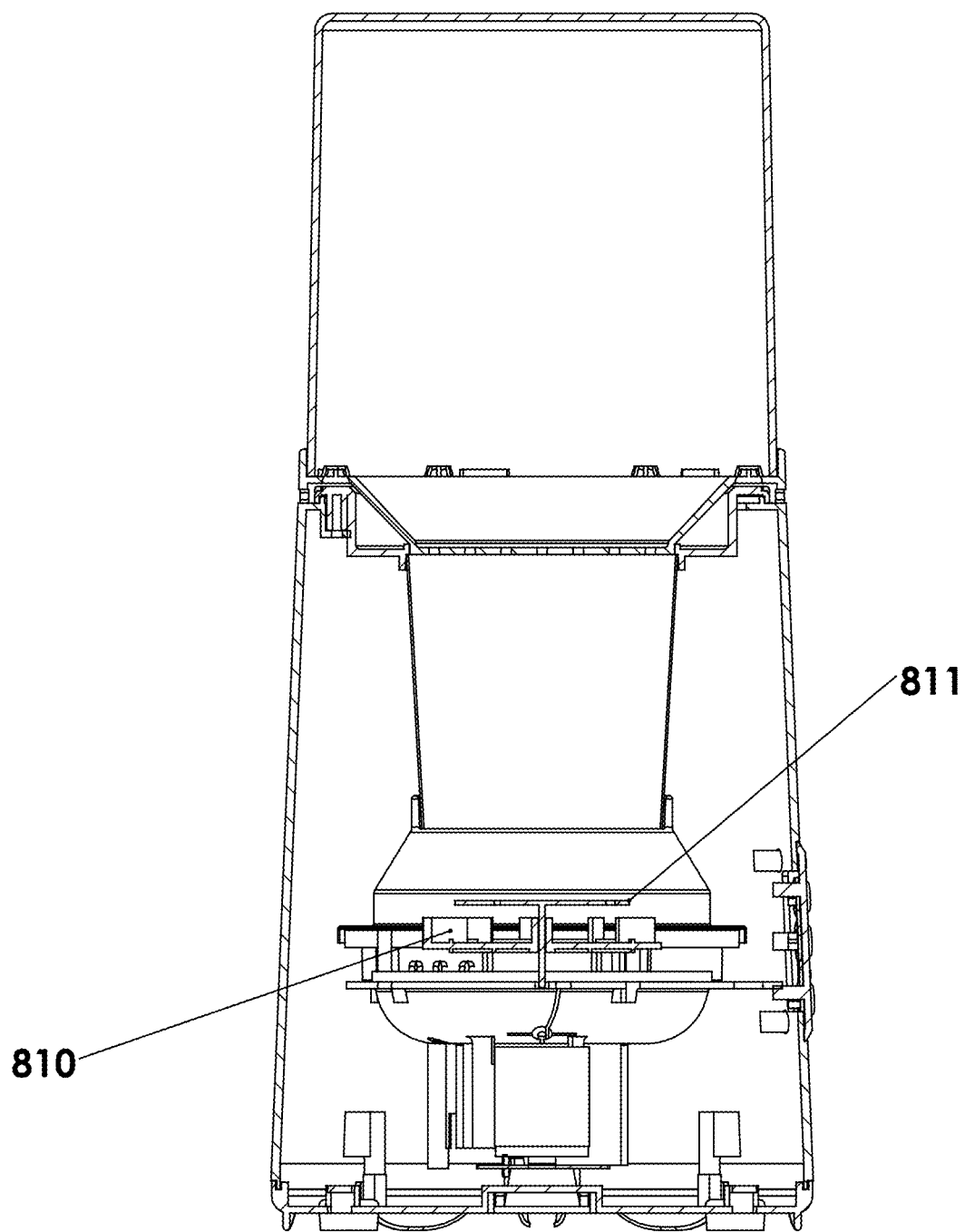
FIG. 8E is a cross section of the container, screen member, adapter ring and base, also showing the location of the heater and the blower, according to an embodiment.

FIG. 8E is a cross section of the container, screen member, adapter ring and base, also showing the location of the heater and the blower, according to an embodiment. A blower 810 and a heater 811 are shown.

FIG. 9A is an upper view of an adapter ring, according to an embodiment. An adapter ring 900 allows the base (which houses the controller (including the electronics) heating element and the blower/motor) to attach to a variety of devices such as a hot air popcorn maker, a snack dehydrator (as illustrated herein), or any other device that utilizes hot blown air for food processing. An attachment (e.g., container, popcorn maker, etc.) snaps onto the top of the adapter ring 900 and the base snaps onto the bottom of the adapter ring 900, thereby connecting the unit into a cohesive whole.

FIG. 9B is a drawing of a container attached to a base, according to an embodiment. The adapter ring 900 snaps between the container 104 (e.g., a canister type of container) and the base.

FIG. 9C is a view of a popcorn hood attached to a base, according to an embodiment. The adapter ring is used to connect the popcorn attachment to the base. The adapter ring allows for a dehydrator and popcorn attachment to utilize same base (controller, heater and blower). The adapter ring 900 is not visible in FIG. 9C.

Figure 10:
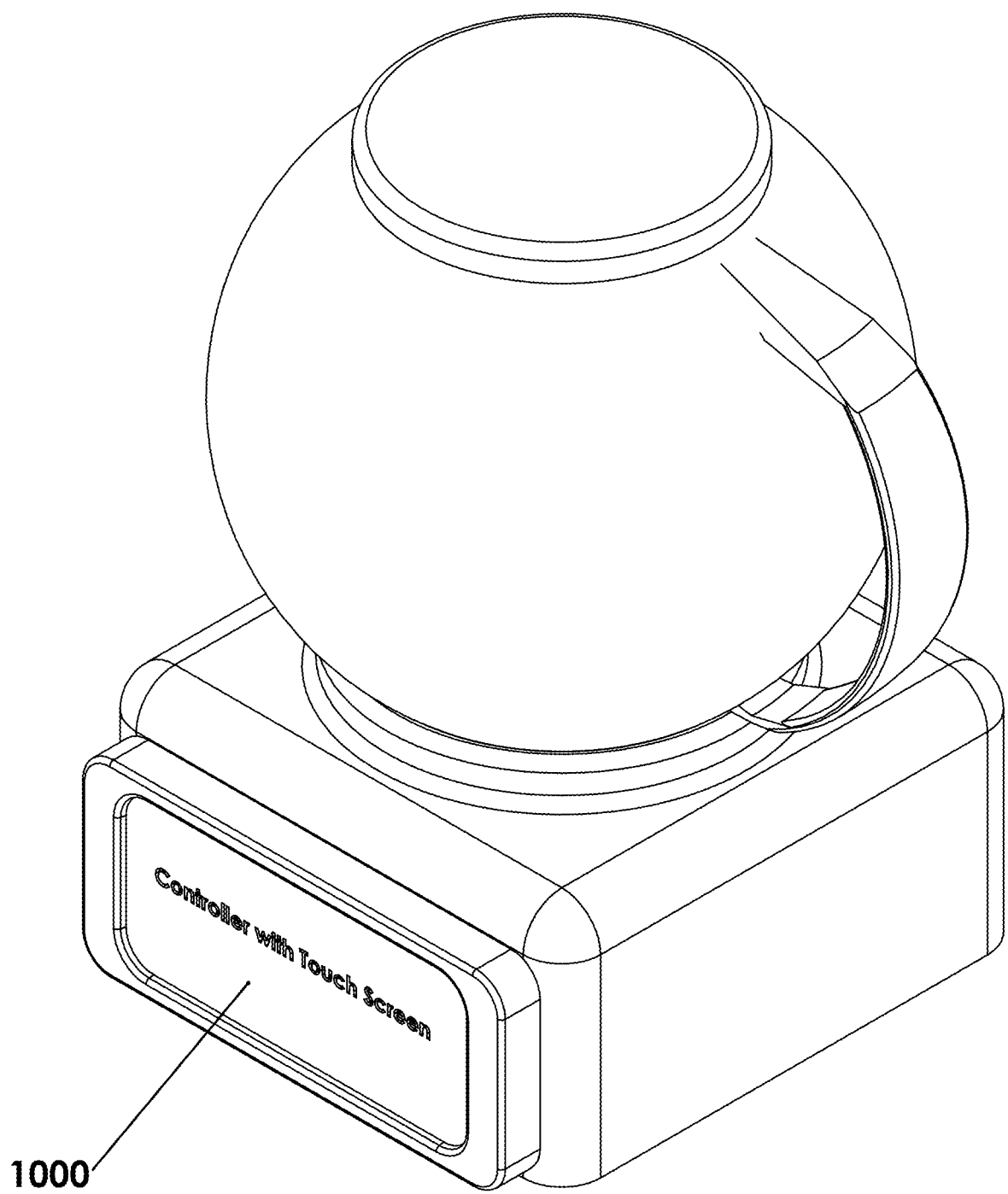
FIG. 10 is a view of a container placed on a base which has a touch screen control, according to an embodiment.

FIG. 10 is a view of a container placed on a base which has a touch screen control, according to an embodiment.

As an alternative to the knobs 101, 102, the base can instead have a touch-screen 1000 which enables the user to control the apparatus entirely using a touch-screen apparatus or remotely from a smart phone using Wi-Fi (or Bluetooth connectivity). The touch-screen apparatus can have virtual temperature knob and a virtual blower power knob which operate in the same manner as the physical knobs. The touch-screen 1000 can utilize any type of graphical user interface (GUI) or smart phone application in order to enable the user to control operation of the apparatus (e.g., separate on/off switch for the blower, on/off switch for the heater/temperate setting for the heater, strength setting for the blower, etc.)

Figure 11:
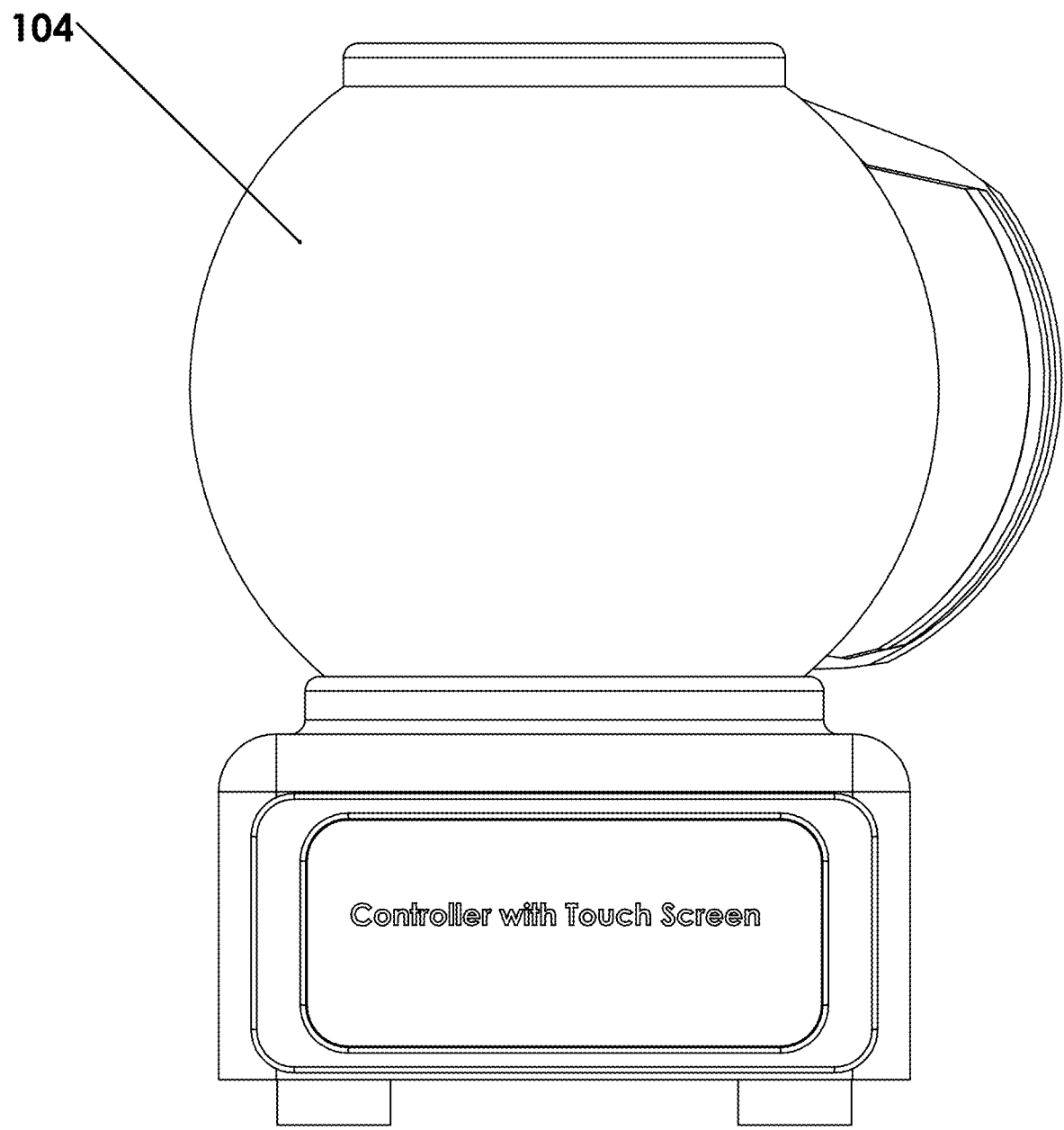
FIG. 11 is a front view of the container placed on the base which has a touch screen control, according to an embodiment.

FIG. 11 is a front view of the container placed on the base which has a touch screen control, according to an embodiment.

Figure 12:
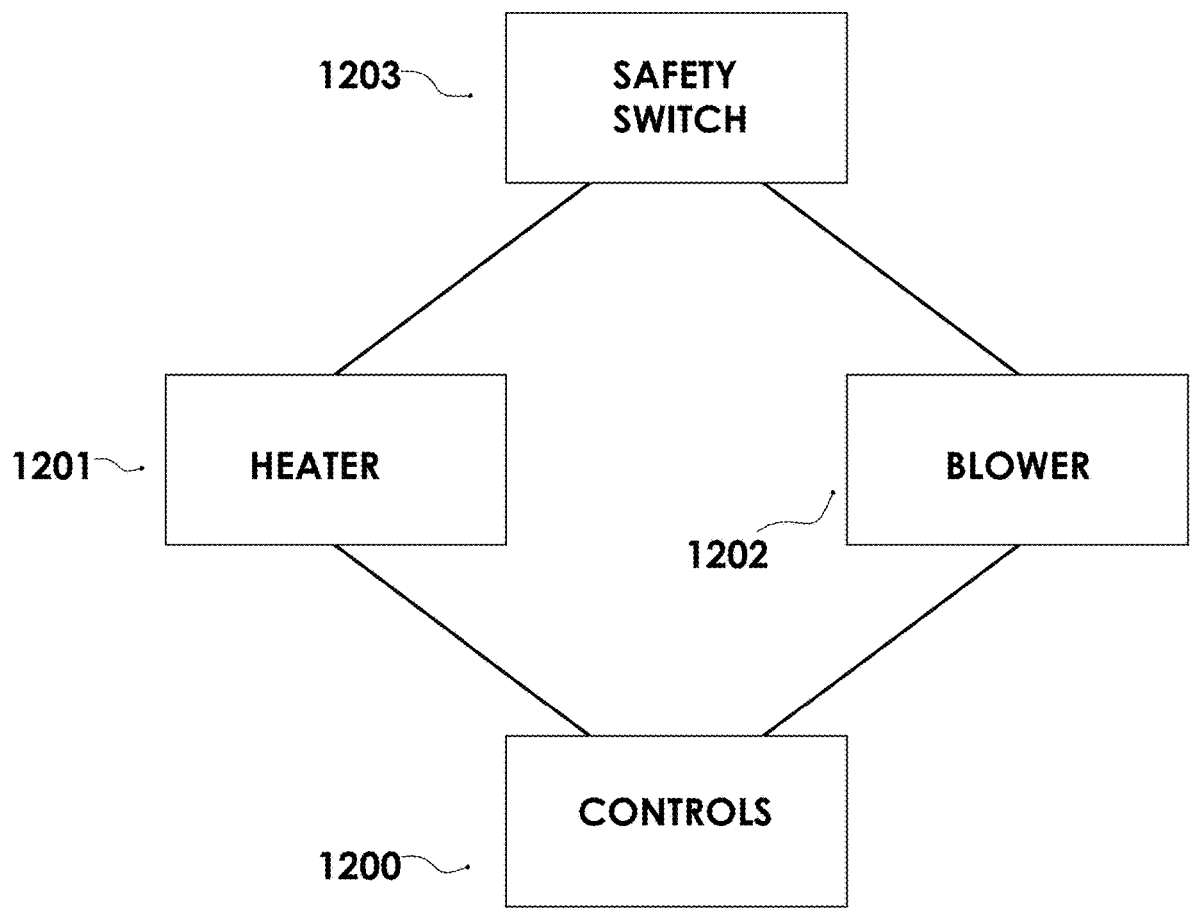
FIG. 12 is a block diagram illustrating components of the refresher apparatus, according to an embodiment.

FIG. 12 is a block diagram illustrating components of the refresher apparatus, according to an embodiment.

The controls (e.g., the knob(s), touch screen, switches, etc.) are electrically connected to the heater 1201 and the blower 1202 thereby controlling the heater 1201 and the blower 1202 as to the user's current settings of the controls 1200. The safety switch 1203 comprises the weights sensor described herein which when the weight is removed, automatically cuts off the power to both the blower 1202 and the heater 1201. While not shown, a power supply is of course included which supplies the adequate amount of power to the blower 1202 and the heater. Blower 1202 includes the motor, fan blower (blades), and any other component needed to drive the blower (e.g., transformer, etc.) Heater 1201 also includes any component needed to operate the heater. An electronic processing unit (not pictured) can also be utilized which connects to all of the components (controls 1200, heather 1201, blower, 1201, safety switch 1203, touch screen 1000, and any other electrical part) which can control the system (e.g., enables the touch screen 1000 to control the system).

A user may wish to implement a "cool down" feature, in which after the heater and blower have been on and the heater has heated up, the heater can be turned off but the blower can remain on for a period of time.

Not illustrated in FIG. 12 is an internet connection so that the apparatus can be connected to, and hence controlled (e.g., powered on, off, etc.) via, the internet. In other words, the apparatus can be configured using the "internet of things."

Note that all of the components herein can be made utilizing any suitable materials, such as plastic (e.g., injection molded), aluminum, rubber, 3-D printed plastic, etc.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
a base comprising a heater and a blower;
a container attached to the base;
a screen between the base and the container; and
a screen member housing the screen, and a plurality of top port holes surrounding the screen member and on an upper surface of the screen member.

2. The apparatus as recited in claim 1, further comprising a blower controller on the base configured to control operation of the blower.

3. The apparatus as recited in claim 1, further comprising a temperature control on the base configured to control a temperature of the heater.

4. The apparatus as recited in claim 1, wherein the top port holes are configured such that when the blower is turned on, air flows from inside the container down through the top port holes.

5. The apparatus as recited in claim 4, further comprising a plurality of lower port holes surrounding the screen member and on a lower surface of the screen member.

6. The apparatus as recited in claim 5, wherein the lower port holes are configured such that when the blower is turned on, air flows outside of the apparatus through the lower port holes.

7. The apparatus as recited in claim 1, further comprising an adapter ring configured to fit between the container and the blower thereby attaching the base to the container.

8. The apparatus as recited in claim 4, wherein the adapter ring is configured to attach to a plurality of alternative containers.

9. The apparatus as recited in claim 8, wherein one of the plurality of alternative containers is a popcorn hood.

10. The apparatus as recited in claim 1, further comprising a touch screen controlled by a processor, the touch screen configured to enable control of the blower and the heater.

11. The apparatus as recited in claim 1, further comprising a safety switch configured to detect a weight of the container and configured such that when the weight of the container is not present then the blower and/or heater are automatically shut off.

12. An apparatus, comprising:
   a base comprising a heater and a blower;
   a container attached to the base;
   a screen between the base and the container; and
   a screen member housing the screen, and a plurality of lower port holes surrounding the screen member and on a lower surface of the screen member.

13. The apparatus as recited in claim 12, further comprising a blower controller on the base configured to control operation of the blower.

14. The apparatus as recited in claim 12, further comprising a temperature control on the base configured to control a temperature of the heater.

15. The apparatus as recited in claim 12, further comprising a plurality of top port holes surrounding the screen member and on an upper surface of the screen member.

16. The apparatus as recited in claim 15, wherein the top port holes are configured such that when the blower is turned on, air flows from inside the container down through the top port holes.

17. The apparatus as recited in claim 12, wherein the lower port holes are configured such that when the blower is turned on, air flows outside of the apparatus through the lower port holes.

18. The apparatus as recited in claim 12, further comprising an adapter ring configured to fit between the container and the blower thereby attaching the base to the container.

19. The apparatus as recited in claim 18, wherein the adapter ring is configured to attach to a plurality of alternative containers.

20. The apparatus as recited in claim 19, wherein one of the plurality of alternative containers is a popcorn hood.

* * * * *